United States Patent
Laakkonen

(10) Patent No.: US 8,219,621 B2
(45) Date of Patent: Jul. 10, 2012

(54) METHOD AND DEVICE FOR HANDLING PUSH TYPE E-MAILS FOR A MOBILE TERMINAL DEVICE ACCORDING TO A USER PROFILE

(75) Inventor: Kimmo Laakkonen, Salo (FI)

(73) Assignee: Nokia Corporation (FI)

( * ) Notice: Subject to any disclaimer, the term of this patent is extended or adjusted under 35 U.S.C. 154(b) by 740 days.

(21) Appl. No.: 10/656,886

(22) Filed: Sep. 4, 2003

(65) Prior Publication Data

US 2005/0055414 A1    Mar. 10, 2005

(51) Int. Cl.
*G06F 15/16* (2006.01)
(52) U.S. Cl. ......... 709/206; 709/204; 709/205; 709/207
(58) Field of Classification Search ........... 709/204–207
See application file for complete search history.

(56) References Cited

U.S. PATENT DOCUMENTS

| | | | |
|---|---|---|---|
| 5,493,692 A * | 2/1996 | Theimer et al. | 455/26.1 |
| 6,237,027 B1 * | 5/2001 | Namekawa | 709/206 |
| 6,320,941 B1 * | 11/2001 | Tyroler | 709/206 |
| 6,396,513 B1 * | 5/2002 | Helfman et al. | 715/752 |
| 6,400,810 B1 * | 6/2002 | Skladman et al. | 379/93.24 |
| 6,484,197 B1 * | 11/2002 | Donohue | 709/206 |
| 6,748,450 B1 * | 6/2004 | Dutta | 709/246 |
| 6,920,483 B1 * | 7/2005 | Cordray et al. | 709/206 |
| 7,076,529 B2 * | 7/2006 | Koch et al. | 709/206 |
| 7,082,439 B1 * | 7/2006 | Hickman et al. | 707/104.1 |
| 7,181,495 B2 * | 2/2007 | Skladman et al. | 709/206 |
| 2002/0002589 A1 * | 1/2002 | Yonenaga et al. | 709/206 |
| 2002/0026513 A1 * | 2/2002 | Hoglund et al. | 709/227 |
| 2002/0044634 A1 | 4/2002 | Rooke et al. | |
| 2002/0087649 A1 | 7/2002 | Horvitz | |
| 2002/0163539 A1 * | 11/2002 | Srinivasan | 345/752 |
| 2003/0014491 A1 * | 1/2003 | Horvitz et al. | 709/206 |
| 2003/0074411 A1 * | 4/2003 | Nale | 709/206 |
| 2003/0120775 A1 * | 6/2003 | York | 709/224 |
| 2003/0163540 A1 * | 8/2003 | Dorricott | 709/206 |
| 2003/0224760 A1 * | 12/2003 | Day | 455/412.1 |
| 2004/0049696 A1 * | 3/2004 | Baker et al. | 713/201 |
| 2004/0122905 A1 * | 6/2004 | Smith et al. | 709/206 |

FOREIGN PATENT DOCUMENTS

| | | |
|---|---|---|
| WO | WO 9933293 | 7/1999 |
| WO | WO 0223309 | 3/2002 |

* cited by examiner

*Primary Examiner* — Brian P Whipple
(74) *Attorney, Agent, or Firm* — Alston & Bird LLP

(57) ABSTRACT

A method for controlling the handling of push type e-mails on a mobile terminal device comprises at least one user profile regarding handling of push type e-mails. The method comprises: determining the status of the user profile and controlling the handling of push type e-mails according to the determined user profile status. A corresponding mobile terminal comprises: a processing unit, a network interface capable of receiving push type e-mails via a network, wherein the network interface is connected to and controlled by the processing unit, wherein the terminal device has a storage connected to the processing unit for storing at least one user profile regarding the handling of push type e-mails, a component to determine the status of the user profile regarding the handling of push type e-mails, and where the processing unit is configured to control the handling of push type e-mails according to the determined status.

12 Claims, 2 Drawing Sheets

METHOD AND DEVICE FOR HANDLING PUSH TYPE E-MAILS FOR A MOBILE TERMINAL DEVICE ACCORDING TO A USER PROFILE

FIELD OF THE INVENTION

The present invention relates to mobile terminal devices having a push type e-mail reception feature. It also relates to dual use terminals i.e. terminals that can be used in a work environment as well as in a private environment. More specifically the present invention relates to a method to provide more readily a clear separation between private and job life, in a highly integrated mobile communication device, wherein push type email delivery is controlled to meet specific demands of users of mobile terminal devices who might be interested in receiving such push type emails only during working hours or other predetermined periods of time.

BACKGROUND OF THE INVENTION

Although push type e-mails have already been generally implemented, such an implementation does not encompass any simple activation/deactivation thereof. During the next couple of years, however, push type e-mail has to be improved. Most office workers are receiving tens of e-mails every day. Depending on the company policy, end-users may use enterprise paid mobile devices in free time as well.

Usually most of the users do not want to receive work-related e-mails in free time and vice versa. Thus, an easy e-mail reception activation and deactivation is desirable to help employees to control better boundaries between work and free time.

It is further desirable to provide an easy, simple and intuitive implementation of the activation and de-activation of the reception of push type e-mail.

It is further desirable to have a method to provide a simple and easy implementation of said e-mail reception feature.

SUMMARY OF THE INVENTION

According to a first aspect of the present invention, there is a method provided for controlling the handling of push type e-mails on a mobile terminal device. The mobile terminal device comprises at least one user profile regarding the handling of push type e-mails. The user profile is a concept wherein a number of operation parameters can be changed simultaneously by single user input. The method comprises determining the status of said user profile, and controlling the handling of push type e-mails according to said determined user profile status.

By determining the status of said user profile regarding the handling of push type e-mails, an actually activated user profile or the status of push type e-mail parameters can be determined. This status determination can be performed automatically e.g. in intervals. This status determination can be performed only when the status is changed e.g. by received user input.

By controlling the handling of push type e-mails according to said determined user profile status, the receipt of push type e-mails can be prevented, received push type e-mails can be filtered out or stored in a hidden manner, with or without notifying the user. In this embodiment, the terminal device itself can e.g. stop or re-activate the receipt of push type e-mails if a respective user profile is detected or selected by a user. This may be regarded as a terminal based solution of user profile based push e-mail control.

In another embodiment of the present invention, said controlling of the handling of push type e-mails comprises sending a notification about the handling of push type e-mails to a push type e-mail server of a mobile communication network, wherein said notification is performed according to said determined user profile.

By sending a notification to a server, the device itself can transfer the task to handle push type e-mails to the server. This may be regarded as a terminal side procedure for a network based implementation. Instead of discarding e-mails by itself, the terminal induces a network server such as a GMSC (gateway mobile switching center) to handle push type e-mails before being forwarded to said terminal device according to the status of a user profile. It is advantageous to minimize the overall number of necessary data transfers, so in the case of less e-mails than profile changes the terminal based procedure can be preferred. In case of a number of e-mails that is larger than the number of profile changes, the server based solution may be advantageous.

It is possible to transfer all operation parameters, i.e. the whole user profile. It may be sufficient to transfer only the push type e-mail relevant data of the user profile status. It is possible to send an "e-mail storage overflow" message to stop the server to send further push type e-mails. The message to the server or another mobile communication network device upon activation of a user profile can be performed by pre-generated messages. The message is selected after a certain user profile has been activated and is then sent to induce the GMSC (gateway mobile switching center) or the Home Location Register (HLR) of the mobile communication network to handle e-mails accordingly.

The filter can be implemented as a time based filter characteristic or a sender based filter characteristic selection. The filter may only allow e-mails from certain senders to pass. The filter may only allow e-mails from certain senders not to pass the filter, but only in a defined time interval.

In yet another embodiment of the present invention, said user profile status comprises 'push type e-mail enabled' or 'push type e-mail disabled'. This may be embodied by activation or deactivation of the hardware or software component required to receive push type e-mails (in the terminal or at a server).

In another embodiment of the present invention, said user profile comprises a predetermined filter performing on the received push type e-mails. The filter selects push type e-mails according to the properties of said e-mails. The method further comprises receiving at least one push type e-mail, and filtering said at least one received e-mail according to said properties.

The filter can be a user selectable filter. It is possible to enable the user to adapt the filter characteristics upon each receipt of a push type e-mail. The filter characteristics can be defined in said user profile. The user profile may comprise a reference to a filter library.

By determining the properties of said received e-mail, unwanted e-mails can be sorted out and discarded. If the filter finds properties that match with the operation parameters of said selected user profile, said e-mail can be passed and made available to said user. The filter determines if the push type e-mail is to be forwarded to the user or not. The push type e-mail may be forwarded immediately to the user or with a time-controlled or an event-controlled delay.

It is also possible to store a received push type e-mail in a 'hidden' manner within said terminal, until a user profile is selected, in which said push type e-mail would have passed said filter. This hidden storing in a temporary way of push e-mails requires that there is at least one user profile/file which said push type e-mail could pass (usually the always present "default user profile"). The hidden temporary storing of push e-mails requires the presence of sufficient memory within said mobile terminal device.

The hidden push e-mails can be made available to the user, if he selects the respective user profile. For example, when coming to the bureau, the user selects work profile, and the device reports the receipt of e.g. 25 push type e-mails.

In another embodiment of the present invention, said method further comprises storing said received push type e-mail. This includes the possibility to retrieve said stored e-mail, e.g. upon a detected change of said user profile status.

In yet another embodiment of the present invention, said terminal device further comprises sensors, and said method further comprises determining sensor data, and changing said user profile according to said determined sensor data. The sensor can be a pressure sensor such as keyboard or a power button. Thus a user can deactivate/active push type e-mail receiving from profiles menu using power button, navigation key or by some other means.

The sensor may also comprise a temperature sensor for automatically changing the user profile to private in case a sensed temperature exceeds a threshold for giving the rest of the day off [school/work] because of excessively hot weather.

In case that a position sensor is used, the user profile can be changed according to a signal from a network cell or a GPS (Global Positioning System), to perform an automated position dependent user profile selection. If a user leaves his workplace and returns home, the terminal detects this position change and adapts its user profile and the handling of push type e-mails automatically. The sensor can determine any kind of environmental data, being correlated to certain user profiles.

According to another aspect of the present invention a method for controlling the handling of push type e-mails destined for mobile terminal devices on a push type e-mail server is provided. Said server stores at least one user profile related to a mobile terminal device, wherein said user profile regards the handling of push type e-mails that are destined for said related mobile terminal device. The method comprises: receiving at the push type e-mail server a notification from said terminal device related to the handling of push type e-mails destined for said terminal device via a mobile communication network. The method further comprises handling said push type e-mails for said terminal device in accordance with said received notification.

Said server can be an e-mail server of a mobile communication network, or e.g. the Internet. This aspect represents the server-side procedure for the network-based implementation of the present method as indicated within the preceding specification. The received notification can cause the server to enable or to disable the forwarding of received push type e-mail to said terminal device. Additionally, the notification can include the application of an e-mail filter acting on the received push type e-mails. The filter selects push type e-mails according to properties of said received e-mails, for forwarding them or not to the terminal device. The server can store received push type e-mail. The filter implementations/characteristics disclosed in the preceding specification can also be applied to the server-based implementation.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of any method contained in the preceding description, when said computer program is run on a computer, or a network device.

According to yet another aspect of the present invention, a mobile terminal device capable of receiving push type e-mails and controlling the handling of push-type emails is provided. The terminal device comprises a processing unit, a network module, a storage and a determination component.

The processing unit is connected to the other components of the mobile terminal device. The processing unit is connected to said network interface and controls said network interface. The network interface is capable of receiving push type e-mails via a network. Said terminal device comprises a storage that is connected to said processing unit. The storage is for storing at least one user profile regarding the handling of push type e-mails. The determination component is provided to determine the status of said user profile regarding the handling of push type e-mails. The processing unit is configured to control the handling of push type e-mails according to said user profile status determined by said determination component.

The components of the mobile terminal device are provided to enable activation and control of the push-type e-mail service integrally with a user selection or a determination of a user profile. The determination component may be implemented within said processor unit.

In another embodiment of the present invention said processing unit is configured to control the handling of push type e-mails according to said determined user profile status by enabling or disabling said network interface for the reception of push type e-mails.

In yet another embodiment, said network terminal device further comprises a push-type e-mail filter. The push-type e-mail filter is connected to said network interface. Said push type e-mail filter is configured to filter received push type e-mails according to properties of received push type e-mails. The filter characteristic defines which e-mails can pass the filter, wherein the filter characteristics are defined by the user profile. The push-type e-mail filter can be connected to said network interface via said processing unit.

In yet another embodiment of the present invention said processing unit is configured to dispatch a message comprising the status of said user profile regarding the handling of push type e-mails. Said notification is sent via said network interface to a push-type e-mail server connected to a mobile communication network.

This foregoing represents an embodiment of a mobile terminal configured to perform the terminal side of the 'network based procedure' for intercepting said push type e-mails before being sent to said terminal. The notification of the server may only be performed, if a change of the user profile is detected that includes a change of the handling of push type e-mails. In case of a change of the user profile status, that does not effect the handling of push e-mails, the notification can be suppressed.

In yet another embodiment of the present invention said mobile terminal device further comprises at least one sensor connected to the processing unit. The processing unit is configured to receive a sensor output from said at least one sensor, and is further configured to change said user profile depending on said output.

In one embodiment said sensor is a position sensor, to change the user profile according to e.g. a position signal from a network cell or a GPS (Global Positioning System). Such a device can perform an automated position dependent user profile change. If a user enters his car and he moves at a considerable speed along an area defined as street, the device can automatically change the user profile, to suppress text type e-mails in order not to bother the user while he is walking. The sensor may also determine any kinds of environmental data, detect a correlation to certain user profiles, and automatically adapt said user profile and hence the handling of push type e-mail to said environmental data.

A keyboard or a navigation key can be regarded as a sensor within the scope of the present invention. This includes the other user interfaces such as touch screen display and the like. The sensor may be implemented in said mobile terminal device as a user profile selector connected to said processing unit and storing selectable user profiles. A user profile selector can be implemented as part of a user interface.

According to another aspect of the present invention, a push-type e-mail server is provided. Said push-type e-mail server is capable of receiving and sending push type e-mails. Said push-type e-mail server comprises a processing unit, a network interface and a storage.

Said processing unit is connected to said network interface and said storage. The network interface is capable of receiving and sending push type e-mails via a network. Said network interface is connected to and controlled by said processing unit. Said network interface is further capable of receiving notifications related to the status of a user profile of at least one mobile terminal device regarding the handling of push type e-mails. Said storage is provided to store said received status of said user profile of said at least one mobile terminal device regarding the handling of push type e-mails. Said processing unit is configured to handle received push type e-mails destined for said at least one mobile terminal according to said received user profile status.

The server is configured to receive a notification indicative of how to proceed with push type e-mails destined for said mobile terminal. This information has been sent to the server upon a determination of a user profile status. The server handles the push type e-mails destined for said terminal device according to the information in said notification, and stores, forwards, deletes, rejects, or re-routes received e-mail. The server may be connected to more than a single communication network, e.g. to a cellular telephone network and e.g. to the Internet.

It is possible to send a notification for the deactivation of the push e-mail feature upon the receipt of a push-type e-mail by the terminal device. The re-activation of a push-type e-mail service may be sent whenever a respective change in the user profile occurs. The server performs the server side procedure of the network-based embodiment of the present invention.

In another embodiment of the present invention said push type e-mail server is embodied as an external mailbox capable of receiving push type e-mails. The e-mail server is a mailbox that automatically pushes the received mail to the terminal of the user. In this case there is no need for polling. When e.g. GPRS (gateway mobile switching center) is in use, the mailbox can automatically push the mails to the terminal of the user.

According to another aspect of the present invention, a push-type e-mail handling system is provided. Said push-type e-mail handling system comprises a server as disclosed in the preceding description, and a mobile terminal as described in the preceding specification capable of receiving push type e-mails.

In the following, the invention will be described in detail by referring to the enclosed drawings in which:

DETAILED DESCRIPTION OF THE INVENTION

Figure 1:
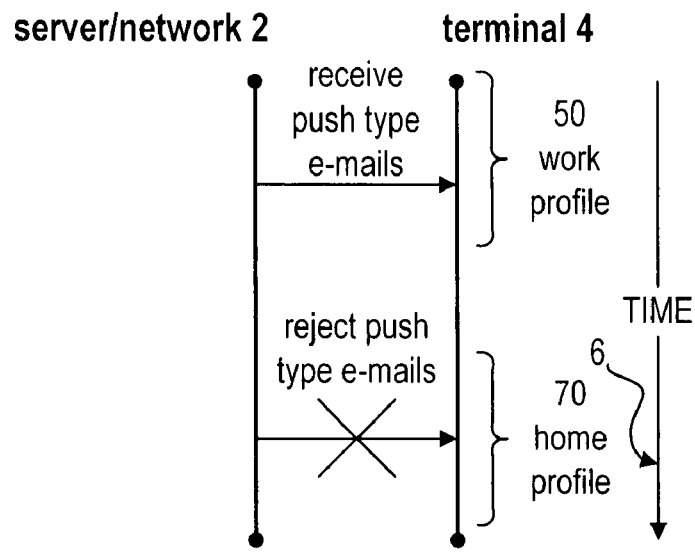
FIG. 1 shows a flowchart of an example of push-type e-mail handling according to one embodiment of the present invention.

FIG. 1 shows a flowchart of an example of push-type e-mail handling according to one embodiment of the present invention. The flowchart comprises a server or network side 2 and a terminal side 4 of a network system. The arrow 6 indicates a time the terminal can be operated with two different user profiles e.g. "work" and "home". If the terminal 4 is in the "work" profile indicated by the bracket 50, the terminal 4 is configured to receive push type e-mails from a server/network 2. If the terminal 4 is in the "home" profile indicated by the bracket 70, the terminal 4 is configured to reject push type e-mails from the server/network 2. The server can be e.g. an external mailbox of the user. This mailbox automatically pushes the received e-mail to user terminal 4. Thus, there is no need for polling. When a GPRS or other push type service is used, the mailbox can automatically push the mails to the terminal. This service is stopped by the invention, when this embodiment of the present invention is used. The user device can e.g. simply ignore that a push type e-mail is sent, or can e.g. delete a received push type e-mail if and when it is received.

It is further preferable that the push e-mail activation/deactivation process can be combined to any user profile. In each profile there is provided a possibility to choose whether the feature is active or not. This could be an alternative solution to the one mentioned above, i.e. having separate work and home profiles.

This situation is different to the case in which a normal circuit switched connection is used to access e-mails, since in this case a user has to always initiate the connection in order to check mails from an external mailbox. In the case of conventional e-mails the present invention does not need to be applied, as the user, simply does not need to check his e-mails if he is at home.

Figure 2:
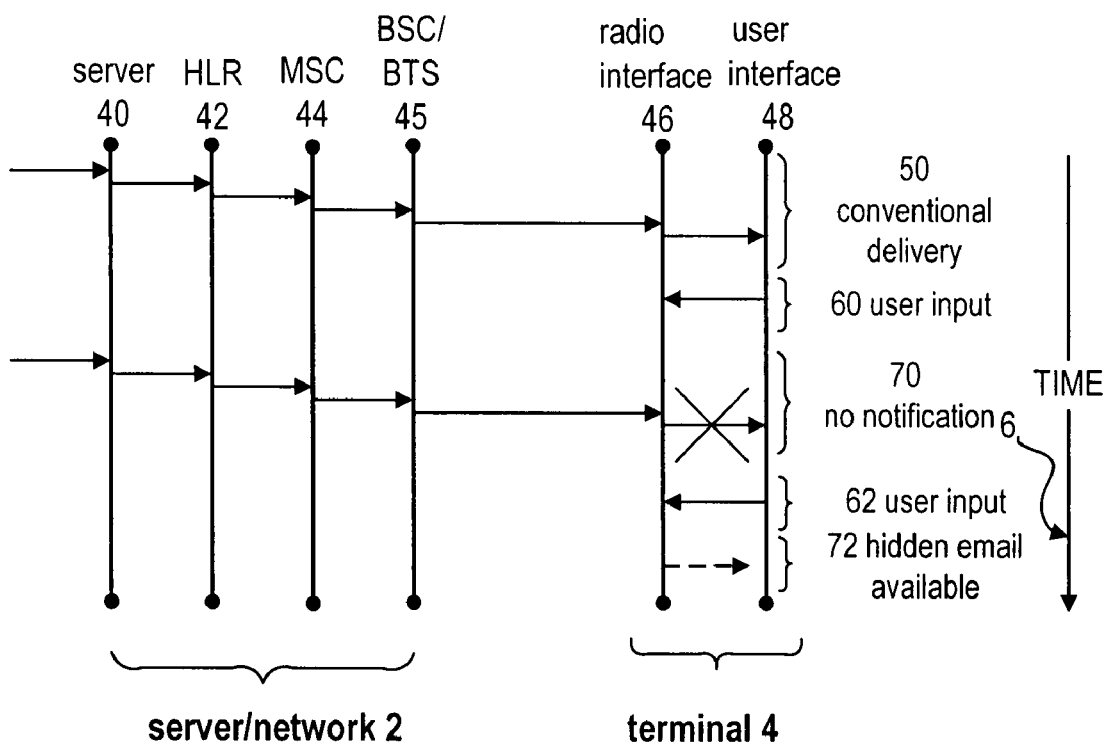
FIG. 2 depicts a flowchart of an example of a push type e-mail handling control method according to another embodiment of the present invention.

FIG. 2 shows a flowchart of another example of push-type e-mail handling according to one embodiment of the present invention. The flowchart comprises a server or network side 2 and a terminal side 4 of a network system. The arrow 6 represents a time axis of the flowchart.

The network side 2 comprises in the present example a server 40, for example a gateway mobile switching center (GMSC), that receives a push-type e-mail. It is expected that the push e-mail is received via a communication network such as a cellular telephone network or e.g. the Internet. The server 40 forwards the push type e-mail using information from the Home Location Register (HLR) 42 to the Mobile Switching Center (MSC) 44. From the MSC 44, the push type e-mail is transferred via a BSC (Base Station Controller) and a BTS (Base Transciever Station) to the mobile terminal 4. To not obscure FIG. 2, the BSC and the BTS are depicted as a common block 45. From the BTS to the mobile terminal 4, the traffic is wireless. The air interface may be provided e.g. via push type e-mail enabled service such as General Packet Radio Service (GPRS) or the like.

The mobile terminal 4 receives the push type e-mail via a radio interface 46 and makes it available to the user via a user interface 48. The first bracket with the reference sign 50 refers to a conventional delivery of push type e-mail to a user device.

The second bracket 60 refers to a user-input changing the user profile of said terminal device 4. The changed user profile induces the terminal device to disable the reception or the notification of a user about push type e-mails received.

The bracket 70 represents the same procedure of delivering push type e-mail to a user device 4 as in the bracket 50. The difference resides in that the user is no longer notified about the reception of said push type e-mail. The user is not notified via the user interface, as the e-mail may not be received. The user is not notified via the user interface, as the e-mail is received but not stored. The user is not notified via the user interface, as the e-mail is received and stored but the receipt of the push type e-mail is not indicated via the user interface 48 to the user.

The lacking of information to the user is indicated by the crossed through arrow between the terminal device 4 and the user interface 48.

The bracket 62 refers to user input for changing the user profile of said terminal device 4. The changed user profile induces the terminal device to re-enable the reception or the notification of a user about received push type e-mail.

After the e-mail receipt is enabled again, e-mails may again be received according to the procedure indicated by bracket 50.

After the e-mail receipt is enabled again, and in case the terminal device has stored a received e-mail without notifying the user, this hidden e-mail may be made available to the user again (indicated by the arrow in bracket 72).

The flowchart of FIG. 2 requires no interaction except the transfer of mails via air interface between the network and the terminal. This procedure can be carried out by terminal device only by implementation.

Figure 3:
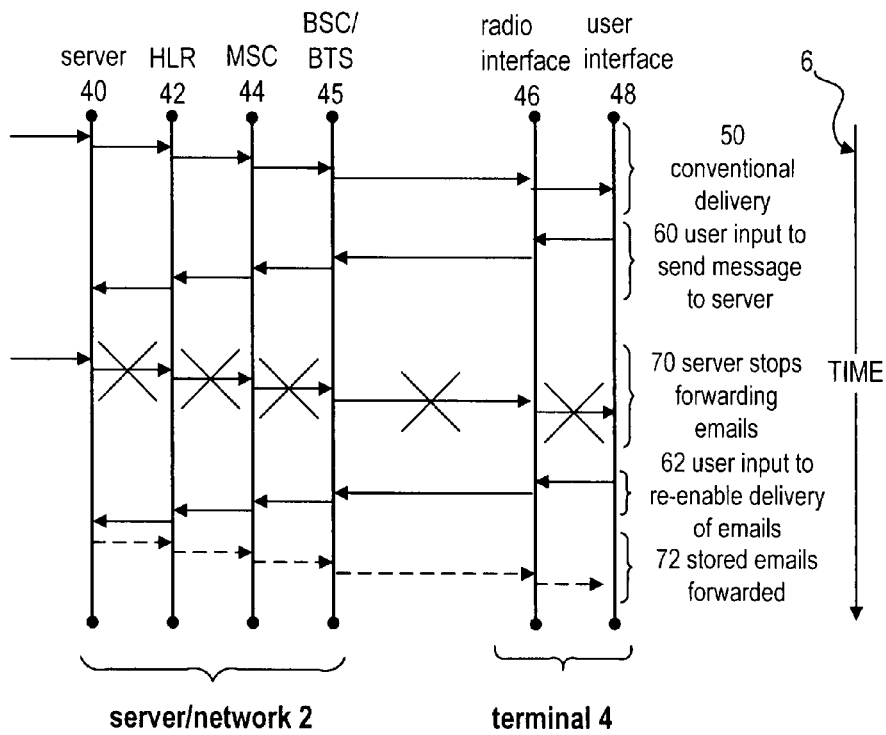
FIG. 3 is a flowchart depicting another example of a user profile controlled push type e-mail handling control method according to another embodiment of the present invention.

FIG. 3 is a flowchart of another example of user profile controlled push type e-mail handling according to another embodiment of the present invention.

Similar to FIG. 2, a server 40 forwards the push type e-mail using information from the Home Location Register (HLR) 42 to the Mobile Switching Center (MSC) 44. From the MSC 44, the push type e-mail is transferred via BSC (Base Station Controller) and BTS (Base Transciever Station) to the mobile terminal 4. To not obscure FIG. 3, the BSC and the BTS are depicted as a common block 45. From the BTS to the mobile terminal 4, the traffic is wireless. The mobile terminal 4 receives the push type e-mail via a radio interface 46 and makes it available to the user via a user interface 48. The first bracket with the reference sign 50 refers to a conventional delivery of push type e-mail to a user device.

Similar to FIG. 2, the second bracket 60 refers to a user input changing the user profile of said terminal device 4, wherein in contrast to FIG. 2 the changed user profile induces the terminal device to send a message to the server 40 e.g. a GMSC via the network 42, 44 and 45. This message is sent to induce the server 40 to intercept all push type e-mails destined for said mobile terminal device 4. So the bracket comprises more steps and, in the following, the server 40 stops forwarding push type e-mails (indicated by the crossed out arrows in bracket 70).

In contrast to the procedure of FIG. 2, a user input (bracket 62) to change the user profile induces the terminal device to send a message to the server 40 via the network 42, 44 and 45. This message induces the server 40 to re-enable the delivery of push type e-mails destined for said mobile terminal device 4.

After the e-mail receipt is enabled again, and in case the server 40 has stored a received e-mail without notifying the terminal device, the stored e-mails may be forwarded and made available to the user (indicated by the dotted arrows in bracket 72).

Figures 4, 5:
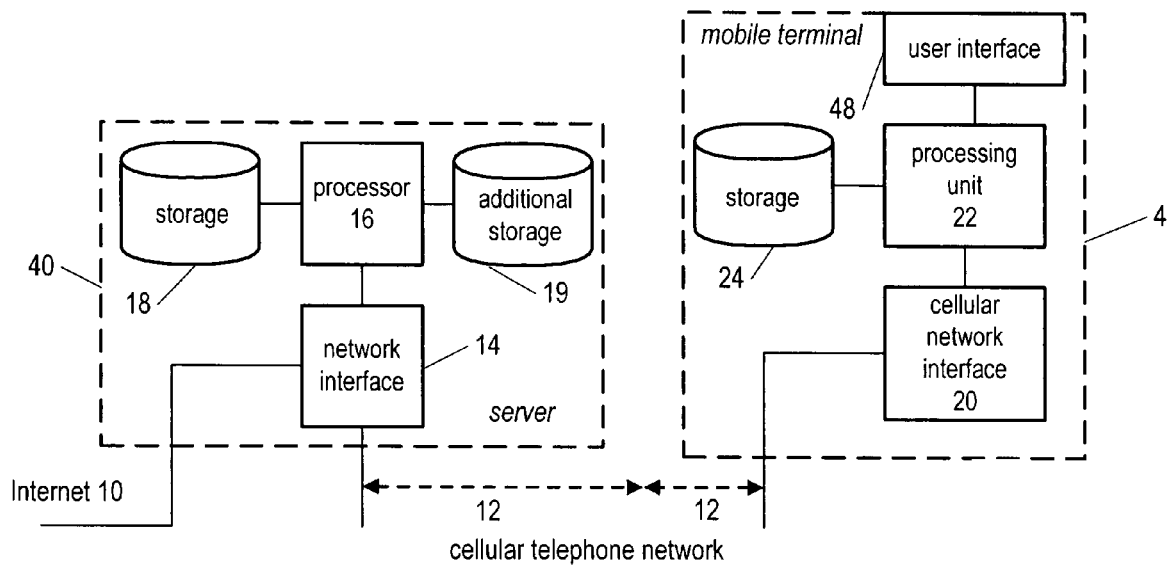
FIG. 4 shows schematically an embodiment of a push type e-mail delivery server according to one embodiment of the present invention.
FIG. 5 shows schematically an embodiment of mobile terminal device according to an embodiment of the present invention.

FIG. 4 shows schematically an embodiment of a push type e-mail delivery server according to one embodiment of the present invention. The depicted embodiment of the server 40 comprises a network interface 14 connecting said server to at least one communication network. The communication network is indicated by two lines, representing a data network as the Internet 10 and a cellular telephone network 12.

The network interface 14 is connected to a processor 16, which is in turn connected to storage 18. It is assumed that the push-type e-mail server 40 is used for performing the network-based implementation of the present invention. It is assumed that the server further comprises additional storage 19 connected to said processor 16 to perform and store e-mails data and the like.

In the server 40, the storage 18 is provided to store address information of a number of mobile terminals and related push e-mail delivery characteristics. The e-mail delivery characteristics can comprise in the simplest case information such as push type e-mail enabled or push type e-mail disabled. More sophisticated approaches may provide more complex delivery characteristics distinguishing between different filter parameters such as amount of data per e-mail (to prevent data overflow at the terminal). Another filter parameter can be the delivery time frame (user does not want to receive a push type e-mail between 23 and 6 o'clock). Another filter parameter can refer to the sender of the e-mail. The storage 18 can store delivery parameters, which are related to certain terminal devices. The delivery parameter can be selected by a user and are received from a user terminal device.

FIG. 5 shows schematically an embodiment of mobile terminal device according to an embodiment of the present invention. The mobile terminal 4 comprises a cellular network interface 20, a processing unit 22, storage 24, and a user interface 48.

As in the case of FIG. 4, the terminal device can comprise further components such as memory modules, broadcast radio modules, music player modules. The mobile terminal device 4 can be operated according to the procedures of FIGS. 1 to 3.

To perform the procedure according to FIG. 2, the internal handling of the received push type e-mails between the network interface 20 and the user interface 48 is influenced by said user profile. It may be assumed that the user profile is stored in the storage 24, and that the user profile can be changed by the user via input in said user interface 48. The activated or selected user profile usually is the default user profile. When changing the user profile, the push type e-mail handling parameters stored in said storage 24 are retrieved and provided to said processor unit 22 to handle received push type e-mail according to the detected user profile status referring to push type e-mails. This may be described as changing the "order of the day", and handling e-mails accordingly.

In another embodiment, said processor 22 can check the user profile status in storage 24, only if a push type e-mail is received. This may be described as waiting for the first e-mail, and retrieving the actual handling instruction on receipt of the first e-mail accordingly.

To perform the procedure according to FIG. 2, the internal handling of the received push type e-mails between the network interface 20 and the user interface 48 is influenced by the status of the user profile stored in storage 24.

To perform the procedure according to FIG. 3, the external handling of push type e-mails in a connected network (server) is influenced by the status of the user profile stored in storage 24. In contrast to the embodiment for procedure of FIG. 2, the storage 24 stores notifications for an external network server. When and if a user changes the actual user profile in storage 24, in a way effecting the handling of push type e-mails, the processor 22 retrieves a notification for a server from storage 24 and dispatches it via the network interface 20 and via said network 12 to said server.

The terminal device performs detecting a change of the user profile and notifying a server about said changed user profile. The change of an internal parameter (user profile) can induce the device to send a message (the notification).

It is also possible to combine the terminal based method and the network based method in a more sophisticated approach, wherein the device determines a disabled state of the push type e-mail, and does not notify the server until a first push type e-mails is received (in the disabled mode). If a user changes between two user profiles with enabled and disabled push type e-mail, but actually receives no e-mails, the server is not notified which saves network resources. Additionally, if a hidden storage of e-mails is desired, the terminal device needs only to store a single e-mail.

The present invention is to solve a problem that has not really actually surfaced at the time of the present application but it may be expected to occur in near future.

The user can benefit from the invention by its good usability. This invention solves usability problems related to activating and deactivating of push type e-mails. The present invention can be implemented in a basic version as a user interface feature, wherein no standard related server-terminal protocols have to be implemented.

A user is able to deactivate/active e-mail receiving from profiles menu using power button or a navigation/menu key or by some other means. The device can comprise a 'work' profile and a 'home' profile. In the work profile the push type e-mail can be activated. In the home profile the push type e-mail can be deactivated. When the user leaves office, he can select home profile for example by using profile button/menu key. Then push type e-mails are not received. The next morning the user can again switch on push type e-mail receiving with profile concept.

During the next couple of years, an improved push type e-mail system will be integrated in all enterprise devices. Most of office workers are receiving 10's of e-mails every day. Depending on company policy end-users can use enterprise paid mobile devices in free time as well. Normally most of the users do not want to receive work related e-mails in free time. Therefore, an easy e-mail receiving activation/de-activation and filtering would help employees to better control boundaries between work and free time.

The present invention solves usability problems of activating, deactivating and customizing of push type e-mail. Easy activation/deactivation of push type e-mail increases the acceptance of user push type e-mail.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, various options of implementing the invention as determined by the claims, including equivalent implementations, also belong to the scope of the invention.

The invention claimed is:

1. A method for controlling the handling of push type e-mails on a mobile terminal device, comprising:
    selecting a user profile stored in said mobile terminal device from a plurality of user profiles stored in said mobile terminal device on the basis of automatically received position information of said mobile terminal device, said user profile regarding the handling of push type e-mails on said mobile terminal device, wherein said selected user profile comprises push type e-mail enabled or push type e-mail disabled,
    filtering received push type e-mail received by the mobile terminal device based on a sender address of the received push type e-mail according to a filter characteristic selection, wherein the filter characteristics are defined in said selected user profile, storing at least one filtered push type e-mail of the received push type e-mail in the mobile terminal device in a manner not visible to said selected user profile when the at least one filtered push type e-mail does not pass the filter characteristics of said selected user profile, and
    controlling at said mobile terminal device the handling of push type e-mails according to said selected user profile, comprising enabling push type e-mail or disabling push type e-mail by activating or deactivating of a hardware or software component required to receive push type e-mails in the mobile terminal device.

2. A method according to claim 1, wherein said controlling of the handling of push type e-mails comprises notifying a push type e-mail server of a mobile communication network about the handling of push type e-mails according to said determined user profile.

3. A method according to claim 2, further comprising storing said received push type e-mail.

4. A method according to claim 1, wherein said user profile comprises a predetermined filter acting on the received push type e-mails, said filter selecting push type e-mails according to properties of said received e-mails, wherein said method further comprises:
    receiving a push type e-mail, and
    filtering said received e-mail according to said properties.

5. A method according to claim 1, wherein said terminal device further comprises sensors, said method further comprising
    determining of sensor data, and
    changing said user profile according to said determined sensor data.

6. A computer program product comprising a non-transitory computer readable storage structure embodying computer program code thereon for execution by a computer processor, wherein said computer program code comprises instructions for:

selecting a user profile stored in a mobile terminal device from a plurality of user profiles stored in said mobile terminal device on the basis of automatically received position information of said mobile terminal device, said user profile regarding the handling of push type e-mails on said mobile terminal device, wherein said selected user profile comprises push type e-mail enabled or push type e-mail disabled, filtering received push type e-mail received by the mobile terminal device based on a sender address of the received push type e-mail according to a sender based filter characteristic selection, wherein the filter characteristics are defined in said selected user profile, and storing at least one filtered push type e-mail of the received push type e-mail in the mobile terminal device in a manner not visible to said selected user profile when the at least one filtered push type e-mail does not pass the filter characteristics of the selected user profile, and controlling at said mobile terminal device the handling of push type e-mails according to said selected user profile, comprising enabling push type e-mail or disabling push type e-mail by activating or deactivating of a hardware or software component required to receive push type e-mails in the mobile terminal device.

7. A mobile terminal device capable of receiving push type e-mails and controlling the handling of push type e-mail, comprising:

a processing unit a network interface capable of receiving push type e-mails via a network, wherein said network interface is connected to and controlled by said processing unit, a storage connected to said processing unit for storing a plurality of user profiles regarding the handling of push type e-mails, a component configured to select at least one user profile from the plurality of user profiles regarding the handling of push type e-mails on the basis of automatically received position information of said mobile terminal device, wherein said selected user profile comprises push type e-mail enabled or push type e-mail disabled, and push type e-mail filter connected to said network interface configured to filter received push type e-mails received by the mobile terminal device based on a sender address of the received push type e-mail according to a filter characteristic selection, wherein the filter characteristics are defined in said selected user profile, wherein said processing unit is configured to control the handling of push type e-mails according to said selected user profile, comprising enabling push type e-mail or disabling push type e-mail by activating or deactivating of a hardware or software component required to receive push type e-mails in the mobile terminal device; and wherein the storage is configured to store at least one filtered push type e-mail of the received push type e-mail in the mobile terminal device in a manner not visible to said selected user profile when the at least one filtered push type e-mail does not pass the filter characteristics of said selected user profile.

8. A mobile terminal device according to claim 7, wherein said processing unit is configured to control the handling of push type e-mails according to said selected user profile by enabling or disabling said network interface for the reception of push type e-mails.

9. A mobile terminal device according to claim 7, wherein said mobile terminal device further comprises a push type e-mail filter connected to said network interface, wherein said filter is configured to filter received push type e-mails according to properties of received push type e-mails, which are defined by said user profile.

10. A mobile terminal device according to claim 7, wherein said processing unit is configured to dispatch a message comprising a status of said user profile regarding the handling of push type e-mails via said network interface to a push type e-mail server connected to a mobile communication network.

11. A mobile terminal device according to claim 7, further comprising at least one sensor connected to said processing unit, wherein said processing unit is configured to change said user profile depending on a sensor output received from said at least one sensor.

12. A push type e-mail delivery system comprising at least one mobile terminal device and a push type e-mail server, wherein the at least one mobile terminal device comprises:

a processor a network interface capable of receiving push type e-mails via a network, wherein said network interface is connected to and controlled by said processor a storage connected to said processor for storing a plurality of user profiles regarding the handling of push type e-mails, a component configured to select the at least one user profile from the plurality of user profiles regarding the handling of push type e-mails on the basis of automatically received position information of said mobile terminal device, wherein said selected user profile comprises push type e-mail enabled or push type e-mail disabled, and push type e-mail filter connected to said network interface configured to filter received e-mails received by the mobile terminal device based on a sender address of the received push type e-mail according to a filter characteristic selection, wherein the filter characteristics are defined in said user profile, wherein said processor is configured to control the handling of push type e-mails according to said selected user profile, comprising enabling push type e-mail or disabling push type e-mail by activating or deactivating of a hardware or software component required to receive push type e-mails in the mobile terminal device, and wherein said storage is configured to store at least one filtered push type e-mail of the received push type e-mail in the mobile terminal device in a manner not visible to said selected user profile when the at least one filtered push type e-mail does not pass the filter characteristics of said selected user profile, and said push type e-mail server comprises:

a processing unit, a network interface capable of receiving and sending push type e-mails via a network, wherein said network interface is connected to and controlled by said processing unit, said network interface is further capable of receiving notifications related to the selection of said user profile of at least one mobile terminal device regarding the handling of push type e-mails, wherein said received notification related to the selection of the user profile is based on automatically received position information for the at least one mobile terminal, and said user profile comprises push type e-mail enabled or push type e-mail disabled, and a storage to store said user profile of said at least one mobile terminal device regarding the handling of push type e-mails, wherein said processing unit is configured to handle received push type e-mails destined for said at least one mobile terminal according to said selected user profile.

* * * * *